United States Patent
Zhu et al.

(10) Patent No.: US 10,235,745 B2
(45) Date of Patent: Mar. 19, 2019

(54) IMAGE PROCESSING METHOD, COMPUTER STORAGE MEDIUM, APPARATUS AND TERMINAL

(71) Applicant: Huawei Technologies Co., Ltd., Shenzhen (CN)

(72) Inventors: Congchao Zhu, Beijing (CN); Wei Luo, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 13 days.

(21) Appl. No.: 15/507,080

(22) PCT Filed: Aug. 27, 2014

(86) PCT No.: PCT/CN2014/085280
§ 371 (c)(1),
(2) Date: Feb. 27, 2017

(87) PCT Pub. No.: WO2016/029380
PCT Pub. Date: Mar. 3, 2016

(65) Prior Publication Data
US 2017/0278229 A1   Sep. 28, 2017

(51) Int. Cl.
*G06T 5/00* (2006.01)
*G06T 5/20* (2006.01)
*G06T 5/50* (2006.01)
*G06T 7/20* (2017.01)
*H04N 5/232* (2006.01)
*G06T 7/174* (2017.01)
(Continued)

(52) U.S. Cl.
CPC .............. *G06T 5/50* (2013.01); *G06T 5/002* (2013.01); *G06T 5/003* (2013.01); *G06T 5/20* (2013.01); *G06T 7/174* (2017.01); *G06T 7/20* (2013.01); *H04N 5/23254* (2013.01); *H04N 5/23277* (2013.01); *H04N 13/20* (2018.05); *G06T 2207/20182* (2013.01); *G06T 2207/20201* (2013.01); *H04N 5/21* (2013.01)

(58) Field of Classification Search
CPC .............. H04N 5/2353; H04N 5/2356; H04N 5/23212; G06T 2207/10144
USPC ....... 382/255, 260, 274, 275, 307; 358/3.26, 358/3.27, 516, 520, 537
See application file for complete search history.

(56) References Cited

U.S. PATENT DOCUMENTS 6,778,210 B1   8/2004 Sugahara et al.
6,784,977 B2 *   8/2004 von Bunau ......... G03F 7/70191
355/53
(Continued)

FOREIGN PATENT DOCUMENTS

CN   1833433 A   9/2006
CN   101331754 A   12/2008
(Continued)

*Primary Examiner* — Yosef Kassa
(74) *Attorney, Agent, or Firm* — Slater Matsil, LLP

(57) ABSTRACT

Embodiments relate to the field of image processing technologies, and in particular, to an image processing method and apparatus. In embodiments, when an image is being photographed, an exposure time that is required is first determined, and if the required exposure time is longer than a preset exposure time, the preset exposure time is used to photograph N second images, that is, and a final image is obtained by processing the N second images.

20 Claims, 4 Drawing Sheets

(51) Int. Cl.
*H04N 13/20* (2018.01)
*H04N 5/21* (2006.01)

(56) References Cited

U.S. PATENT DOCUMENTS

| | | | | | |
|---|---|---|---|---|---|
| 6,847,907 | B1 * | 1/2005 | Novotny | ............ | B81C 99/0045 |
| | | | | | 438/17 |
| 7,158,502 | B2 * | 1/2007 | Harris | ............ | H04W 72/0446 |
| | | | | | 370/345 |
| 7,599,566 | B2 * | 10/2009 | Silverstein | ............ | H04N 5/2353 |
| | | | | | 382/238 |
| 7,602,418 | B2 * | 10/2009 | Border | ............ | G06T 5/50 |
| | | | | | 348/208.6 |
| 7,616,826 | B2 * | 11/2009 | Freeman | ............ | G06T 5/003 |
| | | | | | 348/208.4 |
| 7,664,382 | B2 * | 2/2010 | Yamasaki | ............ | G03B 7/093 |
| | | | | | 348/208.1 |
| 7,773,115 | B2 * | 8/2010 | Estevez | ............ | H04N 5/23248 |
| | | | | | 348/208.13 |
| 7,826,092 | B2 * | 11/2010 | Ejima | ............ | H04N 5/232 |
| | | | | | 358/2.1 |
| 7,924,316 | B2 * | 4/2011 | Silverstein | ............ | H04N 5/2353 |
| | | | | | 348/208.4 |
| 8,018,999 | B2 | 9/2011 | Yao et al. | | |
| 8,237,804 | B2 * | 8/2012 | Torii | ............ | G03B 17/00 |
| | | | | | 348/208.4 |
| 2006/0127084 | A1 | 6/2006 | Okada | | |
| 2007/0077055 | A1 | 4/2007 | Tominaga et al. | | |
| 2010/0157078 | A1 | 6/2010 | Atanassov et al. | | |

FOREIGN PATENT DOCUMENTS

| | | |
|---|---|---|
| CN | 101345824 A | 1/2009 |
| CN | 101426091 A | 5/2009 |
| CN | 101686324 A | 3/2010 |
| CN | 102340626 A | 2/2012 |
| JP | 5567235 B2 | 8/2014 |

* cited by examiner

IMAGE PROCESSING METHOD, COMPUTER STORAGE MEDIUM, APPARATUS AND TERMINAL

CROSS-REFERENCE TO RELATED APPLICATIONS

This application is a National Stage of International Application No. PCT/CN2014/085280, filed Aug. 27, 2014, which is hereby incorporated by reference in its entirety.

TECHNICAL FIELD

The present invention relates to the field of image processing technologies, and in particular, to an image processing method, a computer storage medium, an apparatus, and a terminal.

BACKGROUND

Regardless of whether a mobile phone or a digital camera is used to take a photo, if hand trembling occurs at a moment a shutter button is pressed, photographing quality is affected, which decreases definition of an image and makes the taken photo breezing or blurred, or even causes ghosting. For example, when a mobile phone is used to take a photo, because a sensor of a camera of the mobile phone is relatively small in terms of area, a maximum exposure time with no apparent motion blur during photographing is relatively short, and therefore this phenomenon is more likely to occur. In particular, in a night scene or an indoor scene with low light, to achieve adequate exposure for a photo, generally a relatively long exposure time is required, and therefore this phenomenon is more apparent.

In the prior art, to improve a photographing effect in low illumination and decrease blurring caused due to hand trembling, a professional photographer is usually equipped with an expensive optical image stabilization lens or takes a photo with the assistance of a tripod. However, for a common user who takes a photo at any time anywhere using a mobile phone, these methods are currently not popularized and are inconvenient in actual use.

Therefore, in the prior art, there is a problem that a photographed image has relatively poor quality due to a relatively long exposure time.

SUMMARY

Embodiments of the present invention provide an image processing method, a computer storage medium, an apparatus, and a terminal, so as to resolve a technical problem that a photographed image has relatively poor quality due to a relatively long exposure time.

According to a first aspect of the present invention, an image processing method is provided. The method includes, when a first image is being photographed, determining a first exposure time required for photographing the first image. The method also includes determining whether the first exposure time is longer than a preset exposure time, where a blurring degree of an image photographed according to the preset exposure time is less than or equal to a preset blurring degree. The method also includes separately photographing N second images according to the preset exposure time if the first exposure time is longer than the preset exposure time, where a scene corresponding to the N second images is the same as a scene corresponding to the first image, and N is a positive integer. The method also includes processing the N second images to obtain a first specific image, where a blurring degree of the first specific image is less than a blurring degree of the first image photographed according to the first exposure time.

With reference to the first aspect, in a first possible implementation manner of the first aspect, if N is greater than or equal to 2, the processing the N second images to obtain a first specific image includes: selecting, from the N second images, one second image as a reference image; separately registering remaining N−1 second images to align with the reference image so as to obtain N−1 third images; performing local motion compensation on the N−1 third images to obtain N−1 fourth images; and obtaining the first specific image according to pixel values of all pixels in the reference image and pixel values of all pixels in the N−1 fourth images.

With reference to the first possible implementation manner of the first aspect, in a second possible implementation manner of the first aspect, the separately registering remaining N−1 second images to align with the reference image so as to obtain N−1 third images includes: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

With reference to the first possible implementation manner or the second possible implementation manner of the first aspect, in a third possible implementation manner of the first aspect, the performing local motion compensation on the N−1 third images to obtain N−1 fourth images includes: separately performing, according to the following steps, the local motion compensation on each third image of the N−1 third images to obtain the N−1 fourth images: for the $j^{th}$ pixel included in this third image, determining whether an absolute value of a difference between a pixel value of the $j^{th}$ pixel and a pixel value of the $j^{th}$ pixel in the reference image is greater than or equal to a preset threshold; and if the absolute value of the difference between the pixel value of the $j^{th}$ pixel and the pixel value of the $j^{th}$ pixel in the reference image is greater than or equal to the preset threshold, using the pixel value of the $j^{th}$ pixel in the reference image as the pixel value of the $j^{th}$ pixel, where j is any integer from 1 to M, and M is a total quantity of pixels included in the reference image.

With reference to the third possible implementation manner of the first aspect, in a fourth possible implementation manner of the first aspect, after the determining whether an absolute value of a difference between a pixel value of the $j^{th}$ pixel and a pixel value of the $j^{th}$ pixel in the reference image is greater than or equal to a preset threshold, the method further includes: keeping the pixel value of the $j^{th}$ pixel unchanged if the absolute value of the difference between the pixel value of the $j^{th}$ pixel and the pixel value of the $j^{th}$ pixel in the reference image is less than the preset threshold.

With reference to any possible implementation manner of the first possible implementation manner to the fourth possible implementation manner of the first aspect, in a fifth possible implementation manner of the first aspect, the obtaining the first specific image according to pixel values of all pixels in the reference image and pixel values of all pixels in the N−1 fourth images includes: summing a pixel value of the $i^{th}$ pixel in the reference image and a pixel value of the $i^{th}$ pixel in the N−1 fourth images, where i is any integer from 1 to M, and M is the total quantity of the pixels included in the reference image; and obtaining the first specific image according to an obtained summed pixel value.

With reference to the fifth possible implementation manner of the first aspect, in a sixth possible implementation manner of the first aspect, the obtaining the first specific image according to an obtained summed pixel value includes: obtaining a second specific image according to the obtained summed pixel value; and adjusting luminance and chrominance of the second specific image to obtain the first specific image.

With reference to the sixth possible implementation manner of the first aspect, in a seventh possible implementation manner of the first aspect, the adjusting luminance and chrominance of the second specific image to obtain the first specific image includes: adjusting the luminance of the second specific image according to a luminance histogram; and adjusting the chrominance of the second specific image according to adjusted luminance of the second specific image to obtain the first specific image.

With reference to any possible implementation manner of the first possible implementation manner to the seventh possible implementation manner of the first aspect, in an eighth possible implementation manner of the first aspect, after the determining whether the first exposure time is longer than a preset exposure time, the method further includes: photographing the first image according to the first exposure time if the first exposure time is shorter than or equal to the preset exposure time.

According to a second aspect of the present invention, a computer storage medium is provided, where the computer storage medium stores a program, and when the program is being executed, the steps described above are included.

According to a third aspect of the present invention, an image processing apparatus is provided. The apparatus includes a determining module, configured to: when a first image is being photographed, determine a first exposure time required for photographing the first image. The apparatus also includes a judging module, configured to determine whether the first exposure time is longer than a preset exposure time, where a blurring degree of an image photographed according to the preset exposure time is less than or equal to a preset blurring degree. The apparatus also includes a photographing module, configured to separately photograph N second images according to the preset exposure time if the first exposure time is longer than the preset exposure time, where a scene corresponding to the N second images is the same as a scene corresponding to the first image, and N is a positive integer. The apparatus also includes a processing module, configured to process the N second images to obtain a first specific image, where a blurring degree of the first specific image is less than a blurring degree of the first image photographed according to the first exposure time.

With reference to the third aspect, in a first possible implementation manner of the third aspect, if N is greater than or equal to 2, the processing module is specifically configured to: select, from the N second images, one second image as a reference image; separately register remaining N−1 second images to align with the reference image so as to obtain N−1 third images; perform local motion compensation on the N−1 third images to obtain N−1 fourth images; and obtain the first specific image according to pixel values of all pixels in the reference image and pixel values of all pixels in the N−1 fourth images.

With reference to the first possible implementation manner of the third aspect, in a second possible implementation manner of the third aspect, that the processing module is specifically configured to separately register remaining N−1 second images to align with the reference image so as to obtain N−1 third images is specifically: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

With reference to the first possible implementation manner or the second possible implementation manner of the third aspect, in a third possible implementation manner of the third aspect, that the processing module is specifically configured to perform local motion compensation on the N−1 third images to obtain N−1 fourth images is specifically: separately performing, according to the following steps, the local motion compensation on each third image of the N−1 third images to obtain the N−1 fourth images: for the $j^{th}$ pixel included in this third image, determining whether an absolute value of a difference between a pixel value of the $j^{th}$ pixel and a pixel value of the $j^{th}$ pixel in the reference image is greater than or equal to a preset threshold; and if the absolute value of the difference between the pixel value of the $j^{th}$ pixel and the pixel value of the $j^{th}$ pixel in the reference image is greater than or equal to the preset threshold, using the pixel value of the $j^{th}$ pixel in the reference image as the pixel value of the $j^{th}$ pixel, where j is any integer from 1 to M, and M is a total quantity of pixels included in the reference image.

With reference to the third possible implementation manner of the third aspect, in a fourth possible implementation manner of the third aspect, the processing module is further configured to: after determining whether the absolute value of the difference between the pixel value of the $j^{th}$ pixel and the pixel value of the $j^{th}$ pixel in the reference image is greater than or equal to the preset threshold, keep the pixel value of the $j^{th}$ pixel unchanged if the absolute value of the difference between the pixel value of the $j^{th}$ pixel and the pixel value of the $j^{th}$ pixel in the reference image is less than the preset threshold.

With reference to any possible implementation manner of the first possible implementation manner to the fourth possible implementation manner of the third aspect, in a fifth possible implementation manner of the third aspect, that the processing module is specifically configured to obtain the first specific image according to pixel values of all pixels in the reference image and pixel values of all pixels in the N−1 fourth images is specifically: summing a pixel value of the $i^{th}$ pixel in the reference image and a pixel value of the $i^{th}$ pixel in the N−1 fourth images, where i is any integer from 1 to M, and M is the total quantity of the pixels included in the reference image; and obtaining the first specific image according to an obtained summed pixel value.

With reference to the fifth possible implementation manner of the third aspect, in a sixth possible implementation manner of the third aspect, that the processing module is specifically configured to obtain the first specific image according to an obtained summed pixel value is specifically: obtaining a second specific image according to the obtained summed pixel value; and adjusting luminance and chrominance of the second specific image to obtain the first specific image.

With reference to the sixth possible implementation manner of the third aspect, in a seventh possible implementation manner of the third aspect, that the processing module is specifically configured to adjust luminance and chrominance of the second specific image to obtain the first specific image is specifically: adjusting the luminance of the second specific image according to a luminance histogram; and adjusting the chrominance of the second specific image according to adjusted luminance of the second specific image to obtain the first specific image.

With reference to any possible implementation manner of the first possible implementation manner to the seventh possible implementation manner of the third aspect, in an eighth possible implementation manner of the third aspect, the photographing module is further configured to: after the judging module determines whether the first exposure time is longer than the preset exposure time, photograph the first image according to the first exposure time if the first exposure time is shorter than or equal to the preset exposure time.

According to a fourth aspect of the present invention, a terminal is provided. The terminal includes a memory, an input device, and a processor, where the memory and the input device are separately connected to the processor. The memory is configured to store an instruction. The processor is configured to execute the instruction to: when a first image is being photographed, determine a first exposure time required for photographing the first image; determine whether the first exposure time is longer than a preset exposure time, where a blurring degree of an image photographed according to the preset exposure time is less than or equal to a preset blurring degree; separately photograph N second images according to the preset exposure time by using the input device if the first exposure time is longer than the preset exposure time, where a scene corresponding to the N second images is the same as a scene corresponding to the first image, and N is a positive integer; and process the N second images to obtain a first specific image, where a blurring degree of the first specific image is less than a blurring degree of the first image photographed according to the first exposure time.

With reference to the fourth aspect, in a first possible implementation manner of the fourth aspect, if N is greater than or equal to 2, that the processor is configured to process the N second images to obtain a first specific image is specifically: selecting, from the N second images, one second image as a reference image; separately registering remaining N−1 second images to align with the reference image so as to obtain N−1 third images; performing local motion compensation on the N−1 third images to obtain N−1 fourth images; and obtaining the first specific image according to pixel values of all pixels in the reference image and pixel values of all pixels in the N−1 fourth images.

With reference to the first possible implementation manner of the fourth aspect, in a second possible implementation manner of the fourth aspect, that the processor is specifically configured to separately register remaining N−1 second images to align with the reference image so as to obtain N−1 third images is specifically: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

With reference to the first possible implementation manner or the second possible implementation manner of the fourth aspect, in a third possible implementation manner of the fourth aspect, that the processor is specifically configured to perform local motion compensation on the N−1 third images to obtain N−1 fourth images is specifically: separately performing, according to the following steps, the local motion compensation on each third image of the N−1 third images to obtain the N−1 fourth images: for the $j^{th}$ pixel included in this third image, determining whether an absolute value of a difference between a pixel value of the $j^{th}$ pixel and a pixel value of the $j^{th}$ pixel in the reference image is greater than or equal to a preset threshold; and if the absolute value of the difference between the pixel value of the $j^{th}$ pixel and the pixel value of the $j^{th}$ pixel in the reference image is greater than or equal to the preset threshold, using the pixel value of the $j^{th}$ pixel in the reference image as the pixel value of the $j^{th}$ pixel, where j is any integer from 1 to M, and M is a total quantity of pixels included in the reference image.

With reference to the third possible implementation manner of the fourth aspect, in a fourth possible implementation manner of the fourth aspect, the processor is further configured to execute the instruction to: after determining whether the absolute value of the difference between the pixel value of the $j^{th}$ pixel and the pixel value of the $j^{th}$ pixel in the reference image is greater than or equal to the preset threshold, keep the pixel value of the $j^{th}$ pixel unchanged if the absolute value of the difference between the pixel value of the $j^{th}$ pixel and the pixel value of the $j^{th}$ pixel in the reference image is less than the preset threshold.

With reference to any possible implementation manner of the first possible implementation manner to the fourth possible implementation manner of the fourth aspect, in a fifth possible implementation manner of the fourth aspect, that the processor is specifically configured to obtain the first specific image according to pixel values of all pixels in the reference image and pixel values of all pixels in the N−1 fourth images is specifically: summing a pixel value of the $i^{th}$ pixel in the reference image and a pixel value of the $i^{th}$ pixel in the N−1 fourth images, where i is any integer from 1 to M, and M is the total quantity of the pixels included in the reference image; and obtaining the first specific image according to an obtained summed pixel value.

With reference to the fifth possible implementation manner of the fourth aspect, in a sixth possible implementation manner of the fourth aspect, that the processor is specifically configured to obtain the first specific image according to an obtained summed pixel value is specifically: obtaining a second specific image according to the obtained summed pixel value; and adjusting luminance and chrominance of the second specific image to obtain the first specific image.

With reference to the sixth possible implementation manner of the fourth aspect, in a seventh possible implementation manner of the fourth aspect, that the processor is specifically configured to adjust luminance and chrominance of the second specific image to obtain the first specific image is specifically: adjusting the luminance of the second specific image according to a luminance histogram; and adjusting the chrominance of the second specific image according to adjusted luminance of the second specific image to obtain the first specific image.

With reference to any possible implementation manner of the first possible implementation manner to the seventh possible implementation manner of the fourth aspect, in an eighth possible implementation manner of the fourth aspect, the processor is further configured to execute the instruction to: after determining whether the first exposure time is longer than the preset exposure time, photograph the first image according to the first exposure time by using the input device if the first exposure time is shorter than or equal to the preset exposure time.

According to the embodiments of the present invention, when an image is being photographed, an exposure time required for photographing the first image in a current environment is first determined, and the exposure time is referred to as the first exposure time; after the determining, the first exposure time is compared with the preset exposure time; if the first exposure time is longer than the preset exposure time, it indicates that the first exposure time is excessively long, the first exposure time may be abandoned, and the preset exposure time is used to photograph the N second images, thereby avoiding an excessively long exposure time as much as possible during the image photographing; in addition, an exposure time used for photographing the N images is relatively short, and therefore a possibility that hand trembling occurs on a user is significantly reduced, or even if hand trembling occurs, a blurring degree caused due to the hand trembling is also reduced, thereby effectively improving photographing quality of the image. In addition, the N second images are further processed subsequently to obtain the first specific image, where as compared with the first image photographed according to the first exposure time, the first specific image has relatively high image definition, and a phenomenon such as breezing, blurring, or even ghosting is prevented from occurring on a taken photo.

DETAILED DESCRIPTION OF ILLUSTRATIVE EMBODIMENTS

Figure 1:
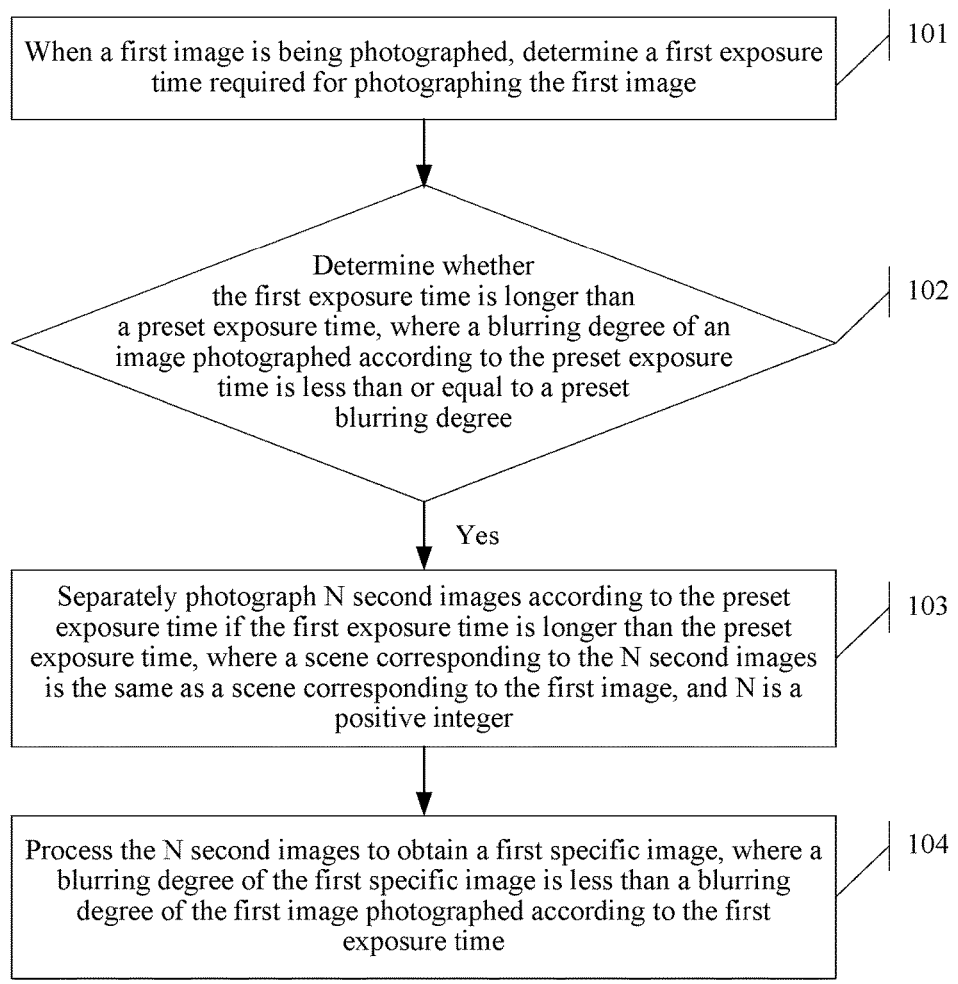
FIG. 1 is a flowchart of an image processing method according to an embodiment of the present invention.

Embodiments of the present invention provide an image processing method, including: when a first image is being photographed, determining a first exposure time required for photographing the first image; determining whether the first exposure time is longer than a preset exposure time, where a blurring degree of an image photographed according to the preset exposure time is less than or equal to a preset blurring degree; separately photographing N second images according to the preset exposure time if the first exposure time is longer than the preset exposure time, where a scene corresponding to the N second images is the same as a scene corresponding to the first image, and N is a positive integer; and processing the N second images to obtain a first specific image, where a blurring degree of the first specific image is less than a blurring degree of the first image photographed according to the first exposure time.

According to the embodiments of the present invention, when an image is being photographed, an exposure time required for photographing the first image in a current environment is first determined, and the exposure time is referred to as the first exposure time; after the determining, the first exposure time is compared with the preset exposure time; if the first exposure time is longer than the preset exposure time, it indicates that the first exposure time is excessively long, the first exposure time may be abandoned, and the preset exposure time is used to photograph the N second images, thereby avoiding an excessively long exposure time as much as possible during the image photographing; in addition, an exposure time used for photographing the N images is relatively short, and therefore a possibility that hand trembling occurs on a user is significantly reduced, or even if hand trembling occurs, a blurring degree caused due to the hand trembling is also reduced, thereby effectively improving photographing quality of the image. In addition, the N second images are further processed subsequently to obtain the first specific image, where as compared with the first image photographed according to the first exposure time, the first specific image has relatively high image definition, and a phenomenon such as breezing, blurring, or even ghosting is prevented from occurring on a taken photo.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, unless otherwise specified.

The following further describes the embodiments of the present invention in detail with reference to accompanying drawings in this specification.

Referring to FIG. 1, an embodiment of the present invention provides an image processing method, where a main procedure of the method is described as follows.

Step 101: When a first image is being photographed, determine a first exposure time required for photographing the first image.

In this embodiment of the present invention, when an image needs to be photographed, an exposure time required for photographing the image may be determined. The image is referred to as the first image, and the exposure time required for photographing the image is referred to as the first exposure time.

For example, the first exposure time required for photographing the first image may be determined by using an automatic exposure (AE) algorithm.

Automatic exposure is that an image processing apparatus automatically adjusts exposure according to light intensity, so as to prevent overexposure or underexposure. It can be understood that the first exposure time is determined according to the light intensity by using the automatic exposure algorithm.

Step 102: Determine whether the first exposure time is longer than a preset exposure time, where a blurring degree of an image photographed according to the preset exposure time is less than or equal to a preset blurring degree.

On the premise that factors such as a weight of an electronic device and a photographing level of a photographer are not considered, the preset exposure time may be estimated according to parameters such as a focal length of a lens and dimensions of a Sensor.

In this embodiment of the present invention, the preset exposure time may refer to a maximum exposure time with no apparent motion blur. That is, a blurring degree corresponding to a photo photographed according to the preset exposure time is within an acceptable range of human eyes, and for human eyes, the photo photographed according to the preset exposure time basically can be viewed normally. It can be understood that the preset blurring degree is a maximum blurring degree acceptable by human eyes.

Step 103: Separately photograph N second images according to the preset exposure time if the first exposure time is longer than the preset exposure time, where a scene corresponding to the N second images is the same as a scene corresponding to the first image, and N is a positive integer.

Generally, $N \geq t/T$, where t represents the first exposure time, and T represents the preset exposure time.

In this embodiment of the present invention, if the first exposure time is longer than the preset exposure time, it indicates that an actually required exposure time is excessively long, and if the first image is photographed according to the first exposure time, in a process from pressing a shutter button to finishing photographing, a user's hand may tremble because of an excessively long time, which may cause the image to be blurred.

Optionally, in this embodiment of the present invention, the separately photographing the N second images according to the preset exposure time if the first exposure time is longer than the preset exposure time may include: if the first exposure time is longer than the preset exposure time, stopping photographing the first image, and separately photographing the N second images according to the preset exposure time.

In this embodiment of the present invention, for the first image, photographing is actually not started, but the exposure time required for photographing the first image is calculated first; therefore, if the first exposure time is longer than the preset exposure time, the photographing of the first image may be given up and the first exposure time may be abandoned, and the preset exposure time may be directly used. In this case, N images may be photographed, where N is a positive integer, and each image herein is referred to as a second image, that is, N second images may be photographed. Preferably, it is preferred that N is greater than or equal to 2, that is, multiple second images may be photographed. In this way, if multiple images are processed, an effect of a finally obtained image is better. Certainly, there may alternatively be a case in which N=1.

In this way, an exposure time required for photographing is not excessively long, the preset exposure time is the maximum exposure time with no apparent motion blur, and a blurring degree of a photographed image is relatively low.

If N is an integer not less than 2, and an electronic device used for photographing is an electronic device provided with only one image acquisition unit, the N second images may be obtained by performing photographing for N times, but if the electronic device used for photographing is an electronic device provided with two image acquisition units, the N second images may be obtained by performing photographing for N/2 times. That is, a quantity of required photographing times is related to a quantity of image acquisition units provided in an electronic device that is used, where the image acquisition unit may be, for example, a camera.

In this embodiment of the present invention, a scene corresponding to the N second images and a scene corresponding to the first image are a same scene, that is, if the first exposure time is longer than the preset exposure time, and the first image cannot be photographed normally, the N second images may be photographed for a scene the same as the scene of the first image. If it is not considered that factors such as a blurring degree of different images are different, the N second images may be deemed as a same image.

In this embodiment of the present invention, that scenes corresponding to two images are the same may mean that framing ranges for a shutter when the two images are photographed are the same, or may mean that focal points for focusing when the two images are photographed are the same, and no specific limitation is imposed thereto in the present invention. That the scenes corresponding to the two images are the same may be approximately understood as that photographed objects included in the two images are the same.

In this way, it is ensured as much as possible that an exposure time used for photographing an image is relatively short, and therefore a possibility that a user's hand trembles during photographing is significantly reduced, or even if hand trembling occurs, a blurring degree caused due to the hand trembling is also reduced, thereby effectively improving photographing quality of the image, improving image definition, and preventing a phenomenon such as breezing, blurring, or even ghosting from occurring on a taken photo.

Optionally, in this embodiment of the present invention, after the determining whether the first exposure time is longer than the preset exposure time, the method may further include: photographing the first image according to the first exposure time if the first exposure time is shorter than or equal to the preset exposure time.

If the first exposure time is not longer than the preset exposure time, it indicates that the exposure time required for photographing the first image is within an acceptable range, and the first image may be photographed directly according to the first exposure time. In this case, a possibility that image blurring is caused because a user's hand trembles is not high.

Step 104: Process the N second images to obtain a first specific image, where a blurring degree of the first specific image is less than a blurring degree of the first image photographed according to the first exposure time.

Optionally, in this embodiment of the present invention, if the N second images are photographed, the N second images further need to be processed to obtain one final image, and this image is referred to as the first specific image.

Optionally, in this embodiment of the present invention, if N is greater than or equal to 2, the processing the N second images to obtain the first specific image may include: selecting, from the N second images, one second image as a reference image; separately registering remaining N−1 second images to align with the reference image so as to obtain N−1 third images; performing local motion compensation on the N−1 third images to obtain N−1 fourth images; and obtaining the first specific image according to pixel values of all pixels in the reference image and pixel values of all pixels in the N−1 fourth images.

Optionally, in this embodiment of the present invention, the separately registering remaining N−1 second images to align with the reference image so as to obtain N−1 third images includes: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

To perform image registration, the reference image needs to be selected first. In this embodiment of the present invention, if multiple second images are photographed, after photographing of the second images is complete, one second image is selected from the multiple second images as the reference image. When the selection is performed, there may be multiple different selection manners: For example, the first photographed second image may be selected as the reference image, or the last photographed second image may be selected as the reference image, or any second image may be selected as the reference image. The present invention imposes no limitation on a specific selection manner.

After the reference image is selected, the remaining N−1 second images of the N second images need to be registered to align with the reference image, and after the registration is complete, the N−1 third images are obtained.

Figure 2:
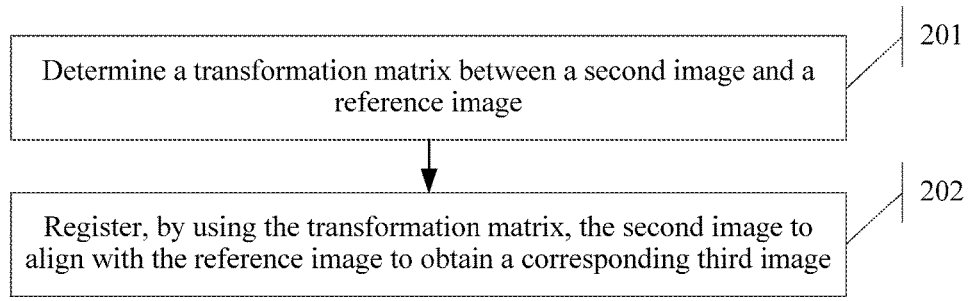
FIG. 2 is a flowchart of a method for performing image registration on one second image according to an embodiment of the present invention.

For example, referring to FIG. 2, a registration process for one second image is described as follows.

Step 201: Determine a transformation matrix between a second image and the reference image.

Each image of the N second images may be represented by $I_i$, where $i=2, 3, \ldots$, or N. For the $I_{i\,th}$ second image, a relative motion relationship between the $I_{i\,th}$ second image and the reference image is estimated. When the relative motion relationship between the $I_{i\,th}$ second image and the reference image is being estimated, to improve noise resistance of an algorithm, a feature point extraction and matching algorithm may be used to determine the transformation matrix between the $I_{i\,th}$ second image and the reference image.

For example, the reference image has 500 pixels in total. Likewise, each second image also has the same 500 pixels in total. When the transformation matrix between the $I_{i\,th}$ second image and the reference image is being determined, for example, some feature points may be determined from all the pixels, that is, all or a part of the 500 pixels may be determined to be used as the feature points. For example, 300 pixels are determined from the 500 pixels to be used as feature points. For each feature point, location information corresponding to the feature point in the $I_{i\,th}$ second image is determined, and location information corresponding to the feature point in the reference image is determined. Then, location transformation information of each feature point can be determined, and according to the location transformation information of each feature point, the transformation matrix between the $I_{i\,th}$ second image and the reference image can be determined. Generally, the transformation matrix may be a 3*3 square matrix.

There are various methods for determining the transformation matrix, and the above is merely a simple example used for description. Specifically, different algorithms may be used when performing the determining, for example, a speeded-up robust feature (SURF) algorithm may be used, or for example, a scale-invariant feature transform (SIFT) algorithm may be used, or the like.

Step 202: Register, by using the transformation matrix, the second image to align with the reference image to obtain a corresponding third image.

For the $I_{i\,th}$ second image, after the transformation matrix is determined, image transformation is performed on the $I_{i\,th}$ second image according to the transformation matrix, so as to align with the reference image to obtain the $I_{i\,th}$ third image corresponding to the $I_{i\,th}$ second image, for example, $I'_i$ may be used to represent each of the N−1 third images, where $i=2, 3, \ldots$, or N−1.

Then, because a moving object such as a pedestrian, a driving vehicle, or the like may exist in a photographing scene when the N second images are being photographed, to reduce a blur and/or ghosting that may exist on the moving object in subsequent processing, detection and compensation need to be performed on a local moving object.

In this embodiment of the present invention, the performing local motion compensation on the N−1 third images to obtain N−1 fourth images includes the following.

Figure 3:
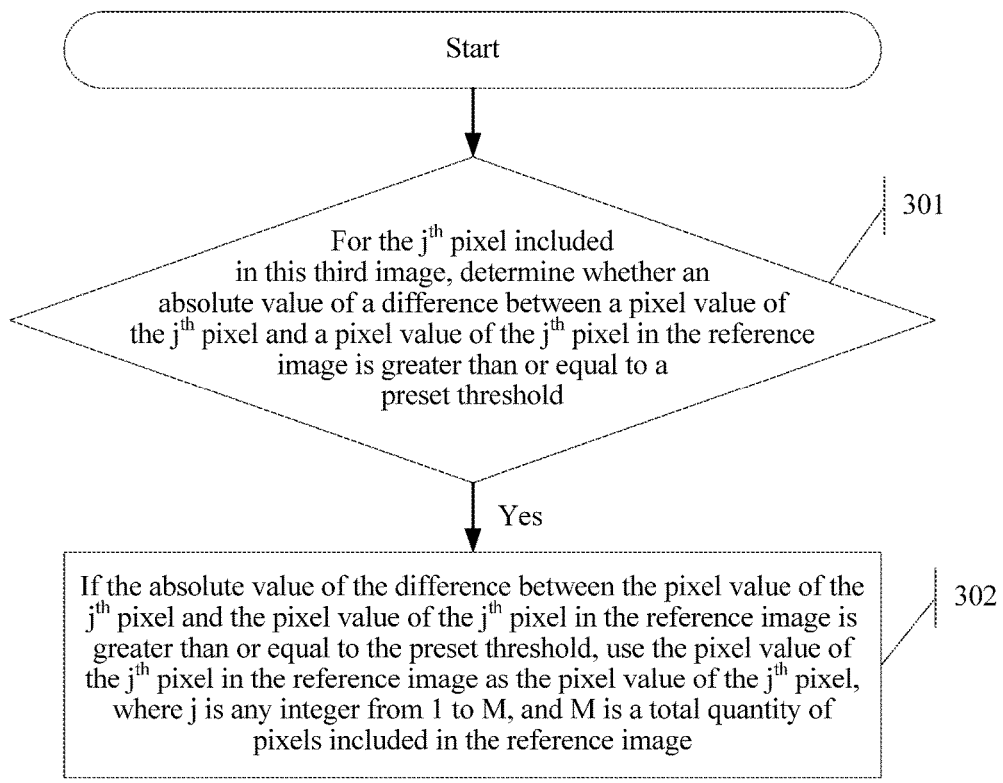
FIG. 3 is a flowchart of a method for performing local motion compensation on a third image according to an embodiment of the present invention.

Referring to FIG. 3, in this embodiment of the present invention, the N−1 fourth images may be obtained by separately performing, according to the following steps, the local motion compensation on each third image of the N−1 third images, and method description is as follows.

Step 301: For the $j^{th}$ pixel included in this third image, determine whether an absolute value of a difference between a pixel value of the $j^{th}$ pixel and a pixel value of the $j^{th}$ pixel in the reference image is greater than or equal to a preset threshold.

For example, $I_1$ is used to represent the reference image, $I_1(x,y)$ is used to represent a pixel value of any pixel $(x,y)$ in the reference image, and $I'_i(x,y)$ is used to represent a pixel value of the same pixel $(x,y)$ in any third image of the N−1 third images, and the following local motion compensation method may be performed on $I'_i(x,y)$:

$$I''_i(x, y) = \begin{cases} I_1(x, y) & \text{if } |I'_i(x, y) - I_1(x, y)| \geq Th \\ I'_i(x, y) & \text{else} \end{cases} \quad (1)$$

In the formula (1), Th represents the preset threshold. Th may be debugged according to experience, or may be an adaptive threshold, and no limitation is imposed thereto in the present invention. $I''_i(x,y)$ represents a pixel value of the same pixel $(x,y)$ in any fourth image of the N−1 fourth images.

If represented by YUV channels, a value of a pixel may be a value of a three-dimensional property. For example, a value of a pixel 1 may be represented by (a, b, c), where a represents a value of a Y channel of the pixel 1, b represents a value of a U channel of the pixel 1, and c represents a value of a V channel of the pixel 1. In this embodiment of the present invention, when the formula (1) is being implemented, what specifically participating in comparison and calculation may refer to a value of a Y channel of a pixel; or a value of each pixel may be deemed as a vector, and what specifically participating in comparison and calculation in the formula (1) may refer to a norm of a vector corresponding to a pixel, or the like.

Step 302: If the absolute value of the difference between the pixel value of the $j^{th}$ pixel and the pixel value of the $j^{th}$ pixel in the reference image is greater than or equal to the preset threshold, use the pixel value of the $j^{th}$ pixel in the reference image as the pixel value of the $j^{th}$ pixel, where j is any integer from 1 to M, and M is a total quantity of pixels included in the reference image.

In the formula (1), if $|I_1'(x,y)-I_1(x,y)| \geq Th$, it indicates that the pixel (x,y) is a pixel corresponding to a moving object. To be aligned with the reference image, a pixel value of this point in the reference image is directly used as a pixel value of this point, which prevents a phenomenon such as blurring, ghosting, or the like that may occur. Otherwise, if $|I_1'(x,y)-I_1(x,y)|<Th$, it indicates that the pixel (x,y) is a pixel corresponding to a non-moving object, and a pixel value of this point may retain a pixel value of this point in the third image, so as to retain valid information in the third image as much as possible.

Optionally, in this embodiment of the present invention, after the determining whether an absolute value of a difference between a pixel value of the $j^{th}$ pixel and a pixel value of the $j^{th}$ pixel in the reference image is greater than or equal to a preset threshold, the method may further include: keeping the pixel value of the $j^{th}$ pixel unchanged if the absolute value of the difference between the pixel value of the $j^{th}$ pixel and the pixel value of the $j^{th}$ pixel in the reference image is less than the preset threshold.

Optionally, in this embodiment of the present invention, the foregoing local motion compensation operation may be performed on each pixel in each third image. In this case, j may be any integer from 1 to M. In this way, the local motion compensation operation is performed on each pixel, which can better prevent occurrence of a motion blurring phenomenon and obtain a better image effect. Alternatively, the foregoing local motion compensation operation may be performed on a part of pixels in each third image. In this case, j may be any of some integers from 1 to M. Which integers used as j, for example, may be selected randomly, or may be selected according to a specific rule, for example, a specific value may be selected, and no limitation is imposed thereto in the present invention. If the local motion compensation operation is performed on only a part of the pixels, required operation steps are fewer, and load of an apparatus is reduced.

After processing on the N−1 third images is complete, the N−1 four images are obtained.

Optionally, in this embodiment of the present invention, referring to FIG. 4, the first specific image is obtained according to pixel values of all pixels in the reference image and pixel values of all pixels in the N−1 fourth images, and method description is as follows:

Step 401: Sum a pixel value of the $i^{th}$ pixel in the reference image and a pixel value of the $i^{th}$ pixel in the N−1 fourth images, where i is any integer from 1 to M, and M is the total quantity of the pixels included in the reference image.

That is, after the image registration and the local motion compensation, an image motion caused by the hand trembling and a motion of an object in a scene are both registered, and in this case, cumulative summing may be separately performed on pixel values of all pixels in the N images.

$$I(x, y) = I_1(x, y) + \sum_{i=2}^{N} I_i''(x, y) \quad (2)$$

In the formula (2), I(x,y) represents a pixel value of any pixel (x,y) in the first specific image, $I_1(x,y)$ represents a pixel value of the same pixel (x,y) in the reference image, and $I_i''(x,y)$ represents a pixel value of the same pixel (x,y) in any fourth image of the N−1 fourth images. In no consideration of non-linear impact of a Sensor, the cumulative summing of the formula (2) is equivalent to performing photographing with an exposure time of N*T.

In this embodiment of the present invention, in the reference image and the N−1 fourth images, same pixels are included in each image. Then, the foregoing summing operation may be performed on each pixel of the reference image and the N−1 fourth images. In this case, i may be any integer from 1 to M, that is, a maximum of M summed pixel values are obtained. The first specific image obtained in this way relatively accurately restores an originally to-be-photographed image and has a better effect, because all original pixels are included. Alternatively, the foregoing summing operation may be performed on a part of the pixels. In this case, i may be any of some integers from 1 to M. Which integers used as i, for example, may be selected randomly, or may be selected according to a specific rule, for example, a specific value may be selected, and no limitation is imposed thereto in the present invention. If only a part of the pixels are selected for the summing operation, required operation steps are fewer, and a workload of an apparatus is reduced; in addition, if the selected pixels are feature points, an obtained image can better restore an originally to-be-photographed image object.

Step 402: Obtain the first specific image according to an obtained summed pixel value.

Figure 4:
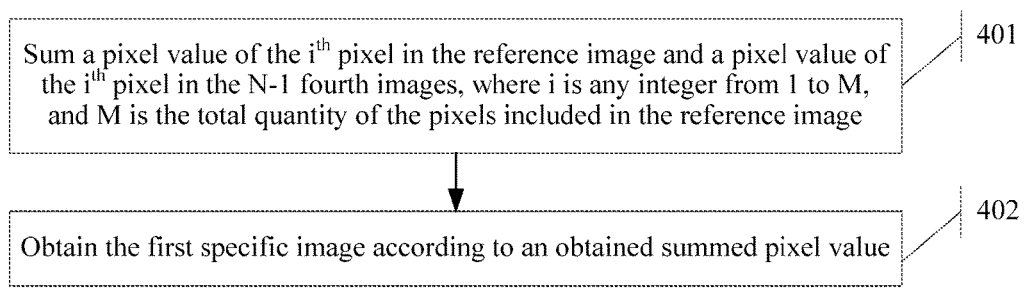
FIG. 4 is a flowchart of a method for obtaining a first specific image according to an embodiment of the present invention.

The following explains a procedure of FIG. 4 by using an example in which the summing operation is performed on each pixel.

For example, the reference image includes three pixels in total, which are respectively a pixel 1, a pixel 2, and a pixel 3. Each of the N−1 fourth images also includes the three pixels in total, namely, the pixel 1, the pixel 2, and the pixel 3. For example, a value of the pixel 1 in the reference image is 1, N=2, a value of the pixel 1 in the first fourth image is 2, and a value of the pixel 1 in the second fourth image is 3; these values of the pixels 1 are summed, and an obtained value of the pixels 1 is 6. A value of the pixel 2 in the reference image is 2, a value of the pixel 2 in the first fourth image is 2, and a value of the pixel 2 in the second fourth image is 4; these values of the pixels 2 are summed, and an obtained value of the pixels 2 is 8. A value of the pixel 3 in the reference image is 1, a value of the pixel 3 in the first fourth image is 2, and a value of the pixel 3 in the second fourth image is 1; these values of the pixels 3 are summed, and an obtained value of the pixels 3 is 4. The first specific image can be obtained according to the newly obtained value (6) of the pixels 1, the value (8) of the pixels 2, and the value (4) of the pixels 3. Certainly, the specific values herein are merely examples but not represent actual values. The examples herein are merely used to describe a manner of obtaining the first specific image.

In addition, what participating in specific calculation may alternatively refer to a value of a Y channel of a pixel; or a value of each pixel may be deemed as a vector, and what specifically participating in calculation may refer to a norm of a vector corresponding to a pixel, or the like.

In an embodiment of the present invention, after the first specific image is obtained, it may be determined whether pixel values of all pixels in the first specific image exceed a maximum pixel value that can be displayed on a display device. If a pixel value of a pixel exceeds the maximum pixel value that can be displayed on the display device, luminance and chrominance of the first specific image may be adjusted separately to obtain an adjusted first specific image. Herein, for distinguishing, after the first specific image is obtained, if the luminance and the chrominance of the obtained first specific image further needs to be adjusted, the first specific image before being adjusted may be referred to as a second specific image, and what obtained after the second specific image is adjusted is referred to as the first specific image.

That is, if pixel values of all pixels in an image obtained according to the summed pixel value are all within a range that can be displayed by the display device, luminance and chrominance of the image may not be further adjusted, and in this case, the image obtained according to the summed pixel value may be referred to as the first specific image. However, if a pixel value of a pixel in pixels included in an image obtained according to the summed pixel value is out of the range that can be displayed by the display device, luminance and chrominance of the image need to be further adjusted, the image obtained according to the summed pixel value may be referred to as the second specific image, and an image obtained after the luminance and the chrominance of the second specific image are adjusted is referred to as the first specific image.

That is, in this embodiment of the present invention, the obtaining the first specific image according to an obtained summed pixel value may include: obtaining a second specific image according to the obtained summed pixel value; and adjusting luminance and chrominance of the second specific image to obtain the first specific image.

Optionally, in this embodiment of the present invention, the adjusting luminance and chrominance of the second specific image to obtain the first specific image includes: adjusting the luminance of the second specific image according to a luminance histogram; and adjusting the chrominance of the second specific image according to adjusted luminance of the second specific image to obtain the first specific image.

The luminance histogram represents a quantity of pixels of each luminance level in the image by using a diagram, and demonstrates a distribution situation of the pixels in the image.

Because a result obtained by an operation of the formula (2) is likely to exceed a dynamic range that can be represented by the display device, that is, pixel values of some pixels are likely to exceed the dynamic range that can be represented by the display device, dynamic range compression needs to be performed on the second specific image to obtain expected luminance distribution. For example, dynamic adaptive compression may be performed according to luminance histogram distribution of the image.

An 8-bit (bit) image with N=6 is used as an example. In the second specific image obtained according to six second images, a maximum value of pixel values is 255*6=1530, different transformation curves may be used according to different cases of a scene in which overall luminance is relatively low, relatively high, or concentrated, so as to obtain relatively good luminance distribution.

For example, if the second specific image is relatively dark overall, a left area of the luminance histogram occupies a relatively large proportion, a convex curve may be used to perform compression to improve the luminance of the second specific image; on the contrary, if the second specific image is relatively bright overall, a concave curve may be used to perform compression to reduce the luminance of the second specific image. If a majority of pixels of the second specific image concentrate in a central area of the luminance histogram, generally, transparency of the image is relatively poor, and an S-shaped curve may be used to perform compression to improve a contrast of the second specific image.

In this embodiment of the present invention, the luminance of the second specific image may be adjusted first, and then the chrominance of the second specific image is adjusted according to a luminance adjustment result.

Corresponding processing is performed on chrominance components (U and V) according to a compression degree of a luminance component (that is, the Y channel), to obtain expected color saturation.

$$u_{out} = (u_{in} - 128 \times N) \times \frac{y_{out}}{y_{in}} + 128 \quad (3)$$

$$v_{out} = (v_{in} - 128 \times N) \times \frac{y_{out}}{y_{in}} + 128 \quad (4)$$

In the formula (3) and the formula (4), $u_{out}$ represents a value of U in the first specific image, $v_{out}$ represents a value of V in the first specific image, $u_{in}$ represents a value of U in the second specific image, $v_{in}$ represents a value of V in the second specific image, $y_{out}$ represents a value of Y in the first specific image, $y_{in}$ represents a value of Y in the second specific image, and $$\frac{y_{out}}{y_{in}}$$

represents the compression degree of the luminance component.

Preferably, in this embodiment of the present invention, a value of N may generally be 5 or 6, and an effect of a final image obtained in this way is relatively good. If the value of N is relatively small, the luminance of the obtained first specific image may be not good in some cases. If the value of N is relatively large, a calculation amount is relatively large, a calculation time is relatively long, and more computing resources are occupied. Therefore, generally, it is a relatively good choice to use 5 or 6 as N. Certainly, in actual application, different values may be used as N according to a need, and embodiments corresponding to various values of N all fall within the protection scope of the present invention.

An embodiment of the present invention provides a computer storage medium, where the computer storage medium stores a program, and when the program is being executed, the steps described in the procedures in FIG. 1 to FIG. 4 are included.

The computer storage medium, for example, includes: any medium that can store program code, such as a USB flash drive, a removable hard disk, a read-only memory (ROM), a random access memory (RAM), a magnetic disk, or an optical disc.

Figure 5:
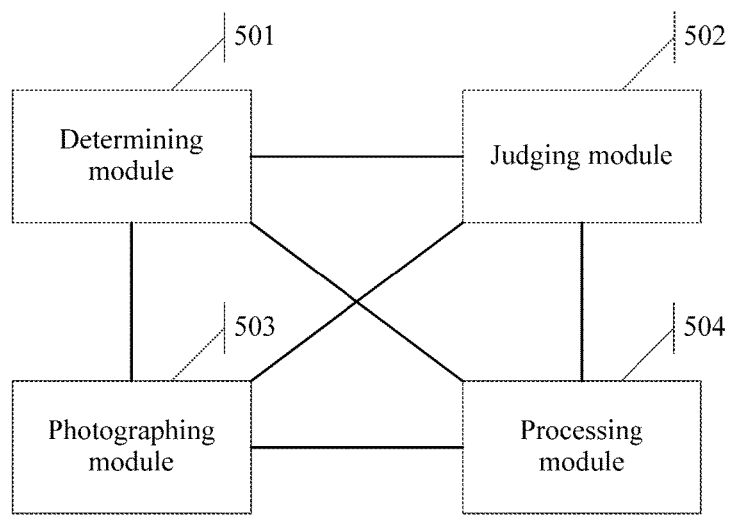
FIG. 5 is a structural block diagram of an image processing apparatus according to an embodiment of the present invention.

Referring to FIG. 5, based on a same inventive concept, an embodiment of the present invention provides an image processing apparatus, where the apparatus may include a determining module 501, a judging module 502, a photographing module 503, and a processing module 504.

The determining module 501 is configured to: when a first image is being photographed, determine a first exposure time required for photographing the first image.

The judging module 502 is configured to determine whether the first exposure time is longer than a preset exposure time, where a blurring degree of an image photographed according to the preset exposure time is less than or equal to a preset blurring degree.

The photographing module 503 is configured to separately photograph N second images according to the preset exposure time if the first exposure time is longer than the preset exposure time, where a scene corresponding to the N second images is the same as a scene corresponding to the first image, and N is a positive integer.

The processing module 504 is configured to process the N second images to obtain a first specific image, where a blurring degree of the first specific image is less than a blurring degree of the first image photographed according to the first exposure time.

Optionally, in this embodiment of the present invention, if N is greater than or equal to 2, the processing module 504 is specifically configured to: select, from the N second images, one second image as a reference image; separately register remaining N−1 second images to align with the reference image so as to obtain N−1 third images; perform local motion compensation on the N−1 third images to obtain N−1 fourth images; and obtain the first specific image according to pixel values of all pixels in the reference image and pixel values of all pixels in the N−1 fourth images.

Optionally, in this embodiment of the present invention, that the processing module 504 is specifically configured to separately register remaining N−1 second images to align with the reference image so as to obtain N−1 third images is specifically: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

Optionally, in this embodiment of the present invention, that the processing module 504 is specifically configured to perform local motion compensation on the N−1 third images to obtain N−1 fourth images is specifically: separately performing, according to the following steps, the local motion compensation on each third image of the N−1 third images to obtain the N−1 fourth images: for the $j^{th}$ pixel included in this third image, determining whether an absolute value of a difference between a pixel value of the $j^{th}$ pixel and a pixel value of the $j^{th}$ pixel in the reference image is greater than or equal to a preset threshold; and if the absolute value of the difference between the pixel value of the $j^{th}$ pixel and the pixel value of the $j^{th}$ pixel in the reference image is greater than or equal to the preset threshold, using the pixel value of the $j^{th}$ pixel in the reference image as the pixel value of the $j^{th}$ pixel, where j is any integer from 1 to M, and M is a total quantity of pixels included in the reference image.

Optionally, in this embodiment of the present invention, the processing module 504 is further configured to: after determining whether the absolute value of the difference between the pixel value of the $j^{th}$ pixel and the pixel value of the $j^{th}$ pixel in the reference image is greater than or equal to the preset threshold, keep the pixel value of the $j^{th}$ pixel unchanged if the absolute value of the difference between the pixel value of the $j^{th}$ pixel and the pixel value of the $j^{th}$ pixel in the reference image is less than the preset threshold.

Optionally, in this embodiment of the present invention, that the processing module 504 is specifically configured to obtain the first specific image according to pixel values of all pixels in the reference image and pixel values of all pixels in the N−1 fourth images is specifically: summing a pixel value of the $i^{th}$ pixel in the reference image and a pixel value of the $i^{th}$ pixel in the N−1 fourth images, where i is any integer from 1 to M, and M is the total quantity of the pixels included in the reference image; and obtaining the first specific image according to an obtained summed pixel value.

Optionally, in this embodiment of the present invention, that the processing module 504 is specifically configured to obtain the first specific image according to an obtained summed pixel value is specifically: obtaining a second specific image according to the obtained summed pixel value; and adjusting luminance and chrominance of the second specific image to obtain the first specific image.

Optionally, in this embodiment of the present invention, that the processing module 504 is specifically configured to adjust luminance and chrominance of the second specific image to obtain the first specific image is specifically: adjusting the luminance of the second specific image according to a luminance histogram; and adjusting the chrominance of the second specific image according to adjusted luminance of the second specific image to obtain the first specific image.

Optionally, in this embodiment of the present invention, the photographing module 503 is further configured to: after the judging module 502 determines whether the first exposure time is longer than the preset exposure time, photograph the first image according to the first exposure time if the first exposure time is shorter than or equal to the preset exposure time.

Figure 6:
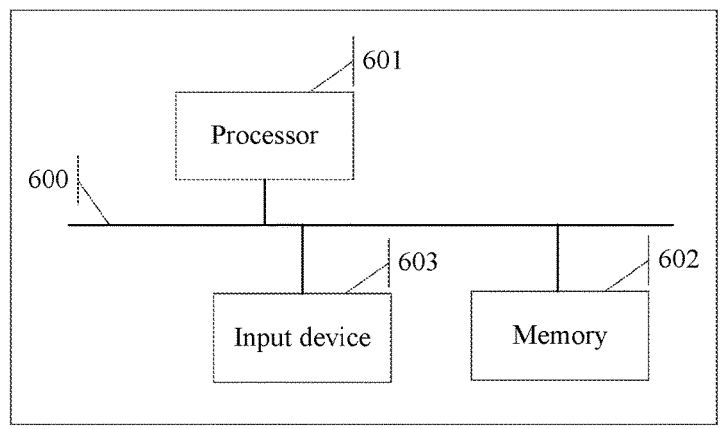
FIG. 6 is a schematic structural diagram of a terminal according to an embodiment of the present invention.

Referring to FIG. 6, based on a same inventive concept, an embodiment of the present invention provides a terminal, where the terminal and the apparatus in FIG. 5 may be a same device. The terminal may include a processor 601, a memory 602, and an input device 603 that are connected to a same bus 600; because they are all connected to the bus 600, the memory 602 and the input device 603 are separately connected to the processor 601.

The memory 602 is configured to store an instruction required by the processor 601 to execute a program. The processor 601 is configured to read the instruction stored in the memory 602 to execute the following method: when a first image is being photographed, determining a first exposure time required for photographing the first image; determining whether the first exposure time is longer than a preset exposure time, where a blurring degree of an image photographed according to the preset exposure time is less than or equal to a preset blurring degree; separately photographing N second images according to the preset exposure time by using the input device 603 if the first exposure time is longer than the preset exposure time, where a scene corresponding to the N second images is the same as a scene corresponding to the first image, and N is a positive integer; and processing the N second images to obtain a first specific image, where a blurring degree of the first specific image is less than a blurring degree of the first image photographed according to the first exposure time.

Optionally, in this embodiment of the present invention, if N is greater than or equal to 2, that the processor 301 is configured to process the N second images to obtain a first specific image is specifically: selecting, from the N second images, one second image as a reference image; separately registering remaining N−1 second images to align with the reference image so as to obtain N−1 third images; performing local motion compensation on the N−1 third images to obtain N−1 fourth images; and obtaining the first specific image according to pixel values of all pixels in the reference image and pixel values of all pixels in the N−1 fourth images.

Optionally, in this embodiment of the present invention, that the processor 301 is specifically configured to separately register remaining N−1 second images to align with the reference image so as to obtain N−1 third images is specifically: for each image of the remaining N−1 second images, separately determining a transformation matrix between this second image and the reference image, and registering, by using the transformation matrix, this second image to align with the reference image so as to obtain a third image corresponding to this second image, where the transformation matrix is used to indicate a relative motion relationship between this second image and the reference image.

Optionally, in this embodiment of the present invention, that the processor 301 is specifically configured to perform local motion compensation on the N−1 third images to obtain N−1 fourth images is specifically: separately performing, according to the following steps, the local motion compensation on each third image of the N−1 third images to obtain the N−1 fourth images: for the $j^{th}$ pixel included in this third image, determining whether an absolute value of a difference between a pixel value of the $j^{th}$ pixel and a pixel value of the $j^{th}$ pixel in the reference image is greater than or equal to a preset threshold; and if the absolute value of the difference between the pixel value of the $j^{th}$ pixel and the pixel value of the $j^{th}$ pixel in the reference image is greater than or equal to the preset threshold, using the pixel value of the $j^{th}$ pixel in the reference image as the pixel value of the $j^{th}$ pixel, where j is any integer from 1 to M, and M is a total quantity of pixels included in the reference image.

Optionally, in this embodiment of the present invention, the processor 301 is further configured to execute the instruction to: after determining whether the absolute value of the difference between the pixel value of the $j^{th}$ pixel and the pixel value of the $j^{th}$ pixel in the reference image is greater than or equal to the preset threshold, keep the pixel value of the $j^{th}$ pixel unchanged if the absolute value of the difference between the pixel value of the $j^{th}$ pixel and the pixel value of the $j^{th}$ pixel in the reference image is less than the preset threshold.

Optionally, in this embodiment of the present invention, that the processor 301 is specifically configured to obtain the first specific image according to pixel values of all pixels in the reference image and pixel values of all pixels in the N−1 fourth images is specifically: summing a pixel value of the $i^{th}$ pixel in the reference image and a pixel value of the $i^{th}$ pixel in the N−1 fourth images, where i is any integer from 1 to M, and M is the total quantity of the pixels included in the reference image; and obtaining the first specific image according to an obtained summed pixel value.

Optionally, in this embodiment of the present invention, that the processor 301 is specifically configured to obtain the first specific image according to an obtained summed pixel value is specifically: obtaining a second specific image according to the obtained summed pixel value; and adjusting luminance and chrominance of the second specific image to obtain the first specific image.

Optionally, in this embodiment of the present invention, that the processor 301 is specifically configured to adjust luminance and chrominance of the second specific image to obtain the first specific image is specifically: adjusting the luminance of the second specific image according to a luminance histogram; and adjusting the chrominance of the second specific image according to adjusted luminance of the second specific image to obtain the first specific image.

Optionally, in this embodiment of the present invention, the processor 301 is further configured to execute the instruction to: after determining whether the first exposure time is longer than the preset exposure time, photograph the first image according to the first exposure time by using the input device 603 if the first exposure time is shorter than or equal to the preset exposure time.

In this embodiment of the present invention, the input device 603 may include a device provided with an image collection function, such as a camera (camera) or a dual camera.

Figure 7:
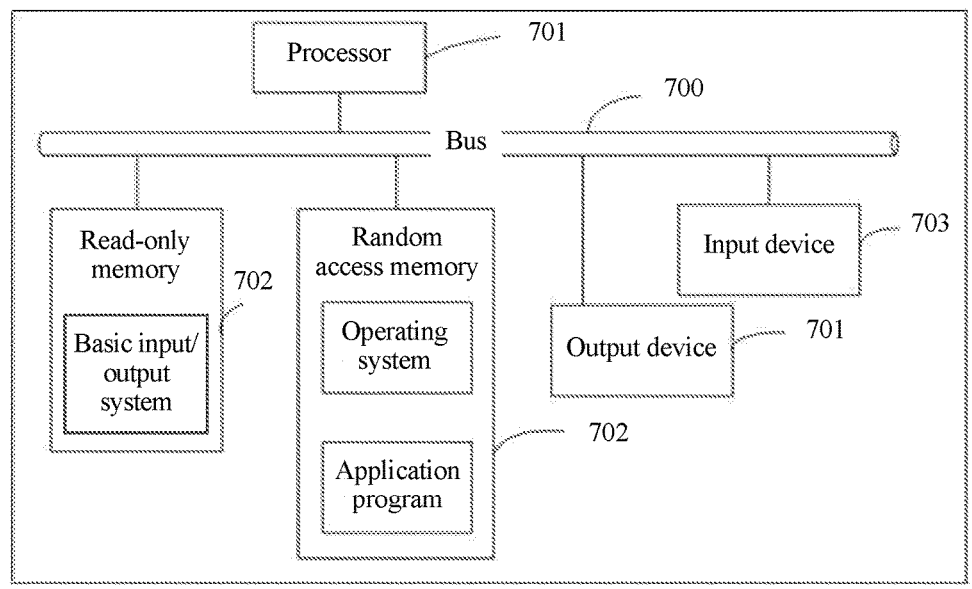
FIG. 7 is another schematic structural diagram of a terminal according to an embodiment of the present invention.

Preferably, referring to FIG. 7, FIG. 7 is another schematic structural diagram of a terminal according to an embodiment of the present invention. The terminal in FIG. 7, the terminal in FIG. 6, and the image processing apparatus in FIG. 5 may be a same device. FIG. 7 is merely a more detailed schematic structural diagram of the terminal.

It can be seen from FIG. 7 that the terminal includes: an input device 703, a processor 701, an output device 701, a random access memory 702, a read-only memory 702, and a bus 700. By using the bus 700, the processor 701 is separately coupled to the input device 703, the output device 701, the random access memory 702, and the read-only memory 702. When the terminal needs to be run, a basic input/output system that is built into the read-only memory 702 leads a system to start up and leads the image processing apparatus to enter a normal operating state. It can be learned that the processor 601 in FIG. 6 and the processor 701 in FIG. 7 are a same component, the bus 600 in FIG. 6 and the bus 700 in FIG. 7 are a same component, the input device 603 in FIG. 6 and the input device 703 in FIG. 7 are a same component, and the memory 602 in FIG. 6 and the random access memory 702 in FIG. 7 are a same component.

After the image processing apparatus enters the normal operating state, an application program and an operating system run in the random access memory 702.

The input device 703 is configured to collect an image, where the input device 703 may include a device provided with an image collection function, such as a camera or a dual camera.

The output device 701 is configured to display a resulting image, where the output device 701 may include a touchscreen, a display, a printer, and the like.

In this embodiment of the present invention, a photographing process with a long exposure time is split into multiple photographing processes with a short exposure time, subsequent registration by an algorithm and cumulative summing are performed, and a result obtained by means of the cumulative summing is dynamically mapped to standard luminance for output, which can reduce blurring caused due to hand trembling and blurring caused due to an object motion in a scene, and can further implement adaptive adjustment of image luminance and play an important role in improving photographing experience of a user.

Embodiments of the present invention provide an image processing method, including: when a first image is being photographed, determining a first exposure time required for photographing the first image; determining whether the first exposure time is longer than a preset exposure time, where a blurring degree of an image photographed according to the preset exposure time is less than or equal to a preset blurring degree; separately photographing N second images according to the preset exposure time if the first exposure time is longer than the preset exposure time, where a scene corresponding to the N second images is the same as a scene corresponding to the first image, and N is a positive integer; and processing the N second images to obtain a first specific image, where a blurring degree of the first specific image is less than a blurring degree of the first image photographed according to the first exposure time.

According to the embodiments of the present invention, when an image is being photographed, an exposure time required for photographing the first image in a current environment is first determined, and the exposure time is referred to as the first exposure time; after the determining, the first exposure time is compared with the preset exposure time; if the first exposure time is longer than the preset exposure time, it indicates that the first exposure time is excessively long, the first exposure time may be abandoned, and the preset exposure time is used to photograph the N second images, thereby avoiding an excessively long exposure time as much as possible during the image photographing; in addition, an exposure time used for photographing the N images is relatively short, and therefore a possibility that hand trembling occurs on a user is significantly reduced, or even if hand trembling occurs, a blurring degree caused due to the hand trembling is also reduced, thereby effectively improving photographing quality of the image. In addition, the N second images are further processed subsequently to obtain the first specific image, where as compared with the first image photographed according to the first exposure time, the first specific image has relatively high image definition, and a phenomenon such as breezing, blurring, or even ghosting is prevented from occurring on a taken photo.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present application. The foregoing storage medium includes: any medium that can store program code, such as a USB flash drive, a removable hard disk, a read-only memory, a random access memory, a magnetic disk, or an optical disc.

The foregoing embodiments are merely used to describe in detail the technical solutions of the present application. The descriptions of the foregoing embodiments are merely intended to help understand the method and core idea of the present invention, and shall not be construed as a limitation to the present invention. Any variation or replacement readily figured out by a person skilled in the art within the technical scope disclosed in the present invention shall fall within the protection scope of the present invention.

The invention claimed is:

1. A method, comprising:
   when a first image is being photographed by a camera, determining a first exposure time required for photographing the first image;
   determining whether the first exposure time is longer than a preset exposure time, wherein the preset exposure time is estimated according to physical parameters of the camera, and a blurring degree of an image photographed according to the preset exposure time is less than or equal to a preset blurring degree;
   separately photographing N second images according to the preset exposure time when the first exposure time is longer than the preset exposure time, wherein a scene corresponding to each of the N second images is the same as a scene corresponding to the first image, and N is a positive integer; and
   processing the N second images to obtain a first specific image, wherein a blurring degree of the first specific image is less than a blurring degree of the first image photographed according to the first exposure time.

2. The method according to claim 1, wherein N is greater than or equal to 2, and processing the N second images to obtain the first specific image comprises:
   selecting, from the N second images, one of the N second images as a reference image;
   separately registering remaining N−1 second images to align with the reference image to obtain N−1 third images;
   performing local motion compensation on the N−1 third images to obtain N−1 fourth images; and
   obtaining the first specific image according to pixel values of pixels in the reference image and pixel values of pixels in the N−1 fourth images.

3. The method according to claim 2, wherein separately registering remaining N−1 second images to align with the reference image to obtain N−1 third images comprises:
   for each image of the remaining N−1 second images, separately determining a transformation matrix between the respective second image and the reference image, and registering, using the transformation matrix, the respective second image to align with the reference image so as to obtain a third image corresponding to the respective second image, wherein the transformation matrix indicates a relative motion relationship between the respective second image and the reference image.

4. The method according to claim 2, wherein performing local motion compensation on the N−1 third images to obtain N−1 fourth images comprises:

for a $j^{th}$ pixel comprised in each respective third image, separately determining whether an absolute value of a difference between a pixel value of the $j^{th}$ pixel of each respective third image and a pixel value of the $j^{th}$ pixel in the reference image is greater than or equal to a preset threshold; and when the absolute value of the difference between the pixel value of the $j^{th}$ pixel of each respective third image and the pixel value of the $j^{th}$ pixel in the reference image is greater than or equal to the preset threshold, using the pixel value of the $j^{th}$ pixel in the reference image as the pixel value of the $j^{th}$ pixel, wherein j is any integer from 1 to M, and M is a total quantity of pixels comprised in the reference image.

5. The method according to claim 4, wherein after determining whether the absolute value of a difference between a pixel value of the $j^{th}$ pixel of each respective third image and a pixel value of the $j^{th}$ pixel in the reference image is greater than or equal to a preset threshold, the method further comprises:

keeping the pixel value of the $j^{th}$ pixel unchanged when the absolute value of the difference between the pixel value of the $j^{th}$ pixel of the respective third image and the pixel value of the $j^{th}$ pixel in the reference image is less than the preset threshold.

6. The method according to claim 2, wherein obtaining the first specific image according to pixel values of pixels in the reference image and pixel values of pixels in the N−1 fourth images comprises:

summing a pixel value of an $i^{th}$ pixel in the reference image and a pixel value of the $i^{th}$ pixel in the N−1 fourth images, wherein i is any integer from 1 to M, and M is a total quantity of the pixels comprised in the reference image; and obtaining the first specific image according to an obtained summed pixel value.

7. The method according to claim 6, wherein obtaining the first specific image according to the obtained summed pixel value comprises:

obtaining a second specific image according to the obtained summed pixel value; and adjusting luminance and chrominance of the second specific image to obtain the first specific image.

8. The method according to claim 7, wherein adjusting the luminance and chrominance of the second specific image to obtain the first specific image comprises:

adjusting the luminance of the second specific image according to a luminance histogram; and adjusting the chrominance of the second specific image according to adjusted luminance of the second specific image to obtain the first specific image.

9. The method according to claim 1, wherein after determining whether the first exposure time is longer than the preset exposure time, the method further comprises:

photographing the first image according to the first exposure time when the first exposure time is shorter than or equal to the preset exposure time.

10. A non-transitory computer storage medium, wherein the non-transitory computer storage medium stores a program, and the program comprises instructions for performing the method according to claim 1.

11. A terminal, comprising:
a non-transitory memory;
a camera; and
a processor, wherein the non-transitory memory and the camera are separately connected to the processor;
wherein the non-transitory memory is configured to store instructions; and
wherein the processor is configured to execute the instructions to:

when a first image is being photographed by the camera, determine a first exposure time required for photographing the first image;

determine whether the first exposure time is longer than a preset exposure time, wherein the preset exposure time is estimated according to physical parameters of the camera, and a blurring degree of an image photographed according to the preset exposure time is less than or equal to a preset blurring degree;

separately photograph N second images according to the preset exposure time by using the camera when the first exposure time is longer than the preset exposure time, wherein a scene corresponding to the N second images is the same as a scene corresponding to the first image, and N is a positive integer; and process the N second images to obtain a first specific image, wherein a blurring degree of the first specific image is less than a blurring degree of the first image photographed according to the first exposure time.

12. The terminal according to claim 11, wherein N is greater than or equal to 2, and processing the N second images to obtain a first specific image comprises:

selecting, from the N second images, one of the N second images as a reference image;

separately registering remaining N−1 second images to align with the reference image to obtain N−1 third images;

performing local motion compensation on the N−1 third images to obtain N−1 fourth images; and obtaining the first specific image according to pixel values of pixels in the reference image and pixel values of pixels in the N−1 fourth images.

13. The terminal according to claim 12, wherein obtaining the first specific image according to pixel values of pixels in the reference image and pixel values of pixels in the N−1 fourth images comprises:

summing a pixel value of an $i^{th}$ pixel in the reference image and a pixel value of the $i^{th}$ pixel in the N−1 fourth images, wherein i is any integer from 1 to M, and M is a total quantity of the pixels comprised in the reference image; and obtaining the first specific image according to an obtained summed pixel value.

14. The terminal according to claim 13, wherein obtaining the first specific image according to an obtained summed pixel value comprises:

obtaining a second specific image according to the obtained summed pixel value; and adjusting luminance and chrominance of the second specific image to obtain the first specific image.

15. The terminal according to claim 12, wherein separately registering remaining N−1 second images to align with the reference image to obtain N−1 third images comprises:

for each image of the remaining N−1 second images, separately determining a transformation matrix between the respective second image and the reference image, and registering, using the transformation matrix, the respective second image to align with the reference image to obtain a third image corresponding to the respective second image, wherein the transformation matrix indicates a relative motion relationship between the respective second image and the reference image.

16. The terminal according to claim 15, wherein performing local motion compensation on the N−1 third images to obtain N−1 fourth images comprises:

separately determining, for a $j^{th}$ pixel comprised in each respective third image, whether an absolute value of a difference between a pixel value of the $j^{th}$ pixel of the respective third image and a pixel value of the $j^{th}$ pixel in the reference image is greater than or equal to a preset threshold; and when the absolute value of the difference between the pixel value of the $j^{th}$ pixel of the respective third image and the pixel value of the $j^{th}$ pixel in the reference image is greater than or equal to the preset threshold, using the pixel value of the $j^{th}$ pixel in the reference image as the pixel value of the $j^{th}$ pixel, wherein j is any integer from 1 to M, and M is a total quantity of pixels comprised in the reference image.

17. The terminal according to claim 16, wherein the processor is further configured to execute the instructions to:

after determining whether the absolute value of the difference between the pixel value of the $j^{th}$ pixel of the respective third image and the pixel value of the $j^{th}$ pixel in the reference image is greater than or equal to the preset threshold, keep the pixel value of the $j^{th}$ pixel of the respective third image unchanged when the absolute value of the difference between the pixel value of the $j^{th}$ pixel of the respective third image and the pixel value of the $j^{th}$ pixel in the reference image is less than the preset threshold.

18. The terminal according to claim 11, wherein the processor is further configured to execute the instructions to:

after determining whether the first exposure time is longer than the preset exposure time, photograph the first image according to the first exposure time using the camera if the first exposure time is shorter than or equal to the preset exposure time.

19. A terminal, comprising:
a non-transitory memory;
a camera; and
a processor, wherein the non-transitory memory and the camera are separately connected to the processor;
wherein the non-transitory memory is configured to store instructions; and
wherein the processor is configured to execute the instructions to:

when a first image is being photographed by the camera, determine a first exposure time required for photographing the first image;

determine whether the first exposure time is longer than a preset exposure time, wherein a blurring degree of an image photographed according to the preset exposure time is less than or equal to a preset blurring degree;

separately photograph N second images by the camera according to the preset exposure time when the first exposure time is longer than the preset exposure time, wherein a scene corresponding to the N second images is the same as a scene corresponding to the first image, and N is a positive integer; and process the N second images to obtain a first specific image, wherein a blurring degree of the first specific image is less than a blurring degree of the first image photographed according to the first exposure time, and wherein when N is greater than or equal to 2, processing the N second images to obtain a first specific image comprises:

selecting, from the N second images, one of the N second images as a reference image;

separately registering remaining N−1 second images to align with the reference image to obtain N−1 third images;

performing local motion compensation on the N−1 third images to obtain N−1 fourth images; and obtaining the first specific image according to pixel values of pixels in the reference image and pixel values of pixels in the N−1 fourth images.

20. The terminal according to claim 19, wherein the processor is further configured to execute the instructions to:
when the first exposure time is shorter than or equal to the preset exposure time, after determining whether the first exposure time is longer than the preset exposure time, photograph the first image by the camera according to the first exposure time.

* * * * *